Figure 1:
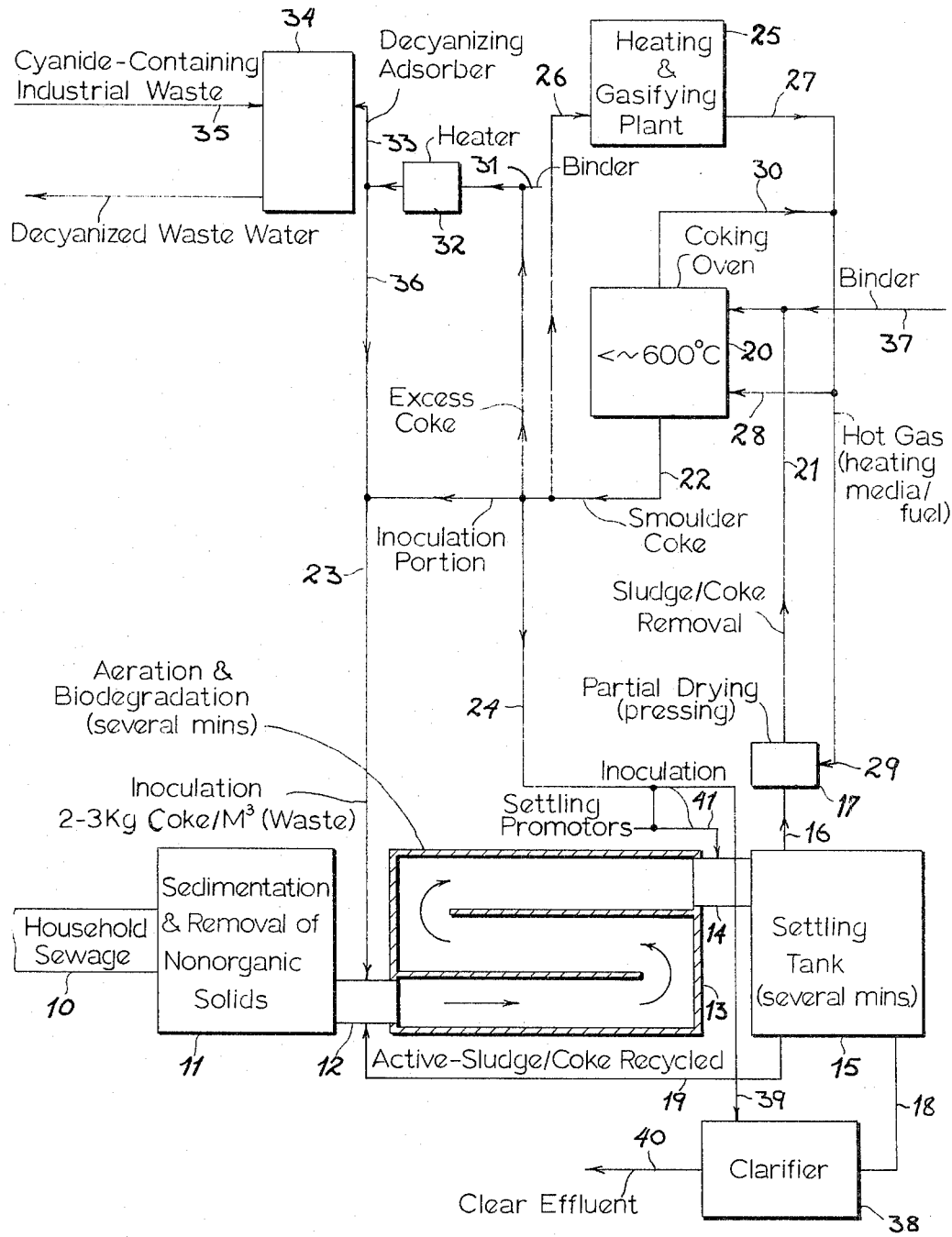

United States Patent Office 3,275,547
Patented Sept. 27, 1966

3,275,547
METHOD OF TREATING SEWAGE
Wilhelm Bucksteeg, Moorenstrasse 35, and Hans Thiele, Weserstrasse 75, both of Essen, Germany
Filed July 20, 1964, Ser. No. 383,748
1 Claim. (Cl. 210—5)

The present invention relates to the treatment of sewage and, more particularly, the purification of household wastes and other effluents containing putrifiable organic matter.

The treatment of collected household wastes and especially sewage containing biologically decomposable organic matter is particularly important in cities and other urban communities and has heretofore involved a variety of biological, chemical and mechanical processes. In general, such treatment involves the introduction of the sewage to be purified into settling tanks in which a relatively clear effluent, which may or may not be further treated, is separated from the sludge. The latter deposits within the settling tank in a relatively dense mass and is characterized by a tendency toward putrefaction.

With time, the quantity of sludge deposited from the sewage accumulates at a high rate so that disposal and storage problems exist, especially in the larger communities. Subsequent treatment of the sludge can be classified in two general categories, namely recovery and disposal. The recovery of the sludge usually takes place by a complete or partial drying or dewatering of the sludge by: centrifugal separation of water from the solid components of the sludge, draining of the water from the solid components on screens or sieves, filtering the solids from the water on filter presses, and thermal drying of the sludge. Disposal of the completely or partially dried sludge can be effected by converting it to fertilizer for agricultural purposes, burning it or gasifying the sludge (e.g. to produce a fuel gas adapted to be used for other purposes). All of these processes are suitable for the after-treatment of putrified and nonputrified sludges deposited from sewage waters. It is clear that the separation and recovery of the sludge from the sewage treatment process is independent of the disposal thereof and that both are separate problems requiring distinct technological considerations.

It is the principal object of the present invention to provide an improved method of treating sewage whereby the removal and disposal of the sewage sludges can be simplified.

A more specific object of this invention is to provide an economical method of recovery and disposing of sewage sludges in such manner that the treatment process is significantly expedited.

Still another object of this invention is to provide a new composition adapted to be added to household sewage and the like for improving its treatment and purification.

Still another object of this invention is to provide a method of producing and using such composition.

These objects and others which will become more readily apparent hereinafter are attained, in accordance with the present invention, by a sewage-treatment process wherein sewage containing biologically decomposable organic matter, especially household sewage such as arise from the gathering of wastes in cities and other urban centers, is introduced into settling tanks—which may be of any conventional type—and the sludge permitted to deposit; the present invention resides in the addition to the sewage prior to its introduction into the settling vessel or to the sewage within the latter of a substance adapted to improve the quality of the sludge and the completeness of its deposition. This substance is a partially carbonized smolder coke obtained by heating at least a portion of a previous batch of the sewage sludge in the absence of oxygen to a temperature sufficient to cause partial distillation of the sludge, i.e. a temperature in excess of about 600° C. The term "smolder coke" will be used to define a substance produced by the partial thermal decomposition of sewage sludge at temperatures above about 600° C. for periods sufficient to carbonize at least partially the sludge, which can be previously freed from excess water by filter pressing or some other means. The sludge smolder coke is added to the sewage to be purified before its admission to the settling vessel (e.g. at an earlier stage in the treatment process) or to the sludge in this vessel. The sludge removed from the vessel will thus contain the newly deposited solids together with the partially carbonized smolder coke added to the sewage and is subjected to a smoldering cokefying process. The excess of the smolder coke above that which is returned to the treatment process to inocculate an incoming sewage stream can be used for other purposes, as will be apparent hereinafter.

According to a more specific feature of this invention, the sludge smolder coke is introduced into the raw sewage in a reaction vessel or tank in which the sewage is subjected to aeration—to accelerate biological decomposition of the organic wastes by aerobic micro-organisms—or merely agitation which permits the carbonized mass to mix thoroughly with the sewage. It has been found, surprisingly, that the product obtained by the smolder carbonization of sewage sludge is a highly effective catalyst capable of accelerating the decomposition of the sewage within the reaction and the aeration tanks while simultaneously serving to promote the settling action in the subsequent vessel; moreover, the smolder coke, which is at least partially carbonized, constitutes an effective purifying agent for the effluent discharged from the plant. This effluent is, therefore, of greater clarity than has been possible heretofore.

The process as generally described above is characterized by the fact that separate recovery processes for putrified and nonputrified sewage sludges are not required while disposal of the sludge removed from the settling tank constitutes no problem. The dewatering of the sludge is also improved by the presence of the carbonized smolder coke which acts as a filtering assistant in a manner not unlike activated charcoal. The presence of carbonized particles in the recovered sludge decreases the amount of energy which must be supplied for the cokefying step in comparison with the amount of energy which had to be supplied in earlier systems for the gasifying or burning of sewage sludge. It may be observed that the mechanical clarification of the raw sewage (i.e. the extent to which solids are removed and impurities are adsorbed) is increased by a factor of many times over that possible by earlier processes. As previously mentioned, the rate at which the sludge deposits in the settling tank increases and, surprisingly, the total volume of the sludge decreases apparently as a consequence of the accelerated decomposition process.

The excess smolder coke, i.e. that produced in amounts above the quantity required to inocculate the raw sewage, can be employed as a fuel for heating the coking furnace or gasified in, for instance, a producer-gas oven. Alternatively, the smolder coke can be added as a filtering assistant to the filter masses of other industrial processes or used as an adsorbent for the removal of oily wastes from liquid streams or the decyanizing of cyanide-containing industrial wastes.

It is thus another feature of the present invention to provide a substance, namely the sludge smolder coke mentioned above, whose catalytic activity renders it suitable as an additive to sewage-treatment vessels in which the catalyst or activator promotes the decomposition of the sewage and improves the settling of the sludge, its pressing and its further treatment. This substance can be used independently of the treatment of household sewage in the depoisoning of other sewage streams (e.g. cyanide-containing wastes) and as adsorbents for various purposes. The activator may be used with a ceramic (e.g. clay) binder and fired together with it to produce a coherent adsorbent having a high effective surface area and activity. The firing can take place subsequent to the production of the smolder coke in a coking furnace; alternatively, the clay binder can be added to the partially dried sludge and heated together with it during cokefying.

Figure 2:
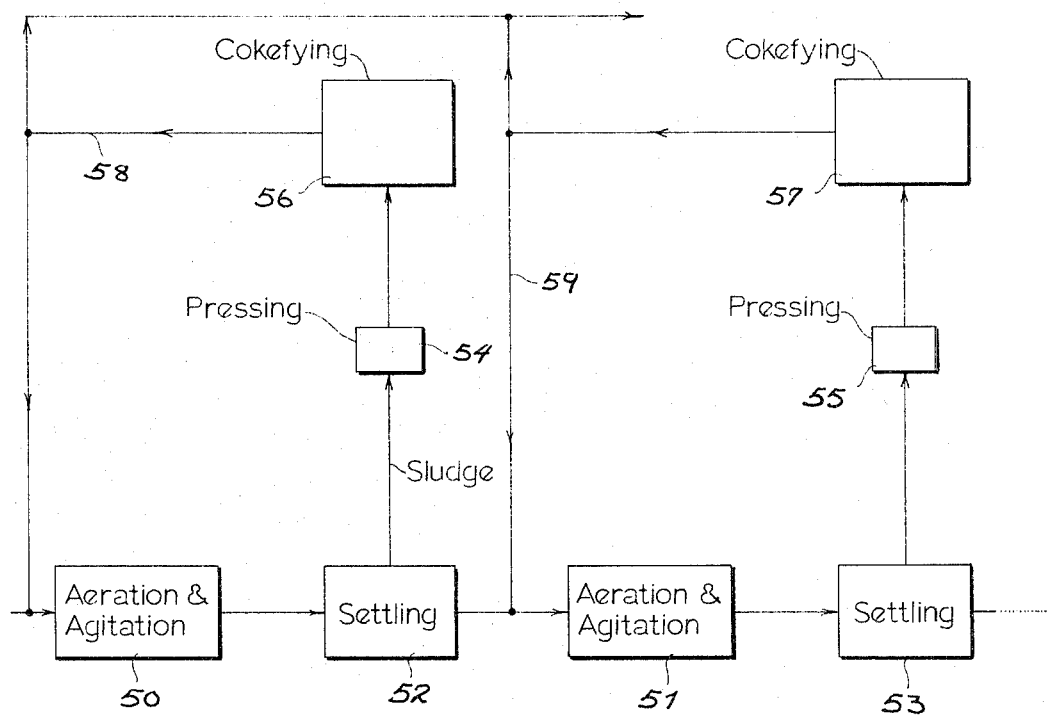

The above and other objects, features and advantages of the present invention will become more readily apparent from the following description and examples, reference being made to the accompanying drawing in which:

FIG. 1 is a flow diagram of a sewage-treatment plant for the processing of collected household wastes and certain industrial sewage; and FIG. 2 is a flow diagram of a portion of another plant embodying the present invention.

In FIG. 1, I show an inlet 10 for raw household sewage gathered from the main sewage lines of an urban community. In the usual manner, the sewage flowing through inlet 10 at a high velocity is introduced into a sedimentation tank 11 where its velocity suddenly decreases and a substantial portion of the inorganic solids carried by the sewage water is deposited. These solids and other floating solids and large particles are removed by moving rakes or the like while the raw sewage passes through a conduit 12 into a reaction tank 13. This tank is arranged in such manner that the sewage meanders over a path whose total length determines the reaction time. The sewage in this tank is agitated and/or aerated in a conventional manner so as to promote biodegradation and decay of the organic constituents of the sewage. From the reaction vessel 13, the sewage passes over a spillway 14 into a settling tank 15 in which the sewage sludge settles and is removed as indicated at 16 for partial drying by a filter press 17. The relatively clear effluent is discharged from the settling tank at 18. If desired, a portion of the micro-organism containing sludge from the settling tank 15 can be returned to the inlet 12 as indicated by the line 19 to inocculate the raw sewage passing into the reaction vessel 13 and thus ensure the presence in the latter of the decay-promoting biological entities.

The sludge, partially freed from water in the press 17, is supplied to a coking oven 20, as indicated by line 21, where it is subjected to smolder heating distillation in the absence of oxygen at a temperature in excess of about 600° C. The resulting sludge smolder coke is at least partially carbonized and is removed from the coking oven 20 (line 22). A portion of the smolder coke equivalent to about 2–3 kg. per cubic meter of raw sewage to be treated is returned to the inlet 12, as indicated via line 23, for admixture with the sewage in the reaction vessel 13. Alternatively, all of this portion of the smolder coke or a fraction thereof can be added directly to the settling tank (line 24) as required.

The excess smolder coke (line 26) can be used as a fuel in a heating or gasifying plant 25 whose hot gases (line 27) can be fed to the coking oven 20 to heat the latter (line 28) or to the dewatering station 17 (line 29) to effect partial drying of the sludge. The waste gases (line 30) of the coking oven can be combined with the gas stream of plant 25. Alternatively, all or part of the excess smolder coke can be converted, by firing it with a binder (line 31) in a heater 32, to a decyanizing adsorber (line 33). The adsorber can be used to fill an adsorption column 34 into which cyanide-containing industrial waste is fed (line 35), the decyanized waste water being then disposed of (e.g. by combining it with the raw sewage at inlet 12, or, if no organic matter is present, with the clear effluent of settling tank 15). Since it is frequently desirable that the smolder-coke catalyst added to the raw sewage at inlet 12 also be combined with the binder, a portion of the smolder coke treated in heater 32 can be used instead of the smolder coke fed directly from oven 20 to the sewage stream as indicated by line 36. However, the binder may be added (line 37) to the smolder coke prior to its introduction into the oven 20, in which case the heater 32 and binder supply line 31 can be eliminated. Part of the excess smolder coke, with or without binder, can be supplied to a clarifier 38 via line 39 to further adsorb any residual impurities from the effluent from tank 15. Clear waste water results at outlet 40 and can be introduced to a body of water without polluting it. If desired, various convention settling promoters (e.g. iron salts, lime or aluminum salts), serving as coagulators and flocculants, can be added (line 41) to the settling tank.

In the system of FIG. 2, a succession of aeration and agitation reaction vessels 50, 51 . . . are provided, each feeding a respective settling tank 52, 53 from which the sludge is removed and pressed 54, 55. The sludge is then cokefied in distillation ovens 56, 57 with the smolder coke being fed back to the respective inlets via lines 58, 59. Excess smolder coke is used as described with respect to FIG. 1. In this system, different quantities of smolder coke can be returned at the inlet to each of the reaction vessels.

*Example I*

In an apparatus of the type illustrated in FIG. 1, substantially 2–3 kg. of the smolder coke is supplied per $m.^3$ of raw sewage at the inlet to the reaction vessel in which the sewage is agitated and aerated. In the reaction vessel, the sewage has a treatment time of several minutes and then passes into the settling tank in which it is permitted to deposit its sludge in a corresponding period of time. Precipitating agents or settling promotors (iron salts and lime or aluminum salts) are added in a conventional manner to the settling tank. A portion of the active sludge of the settling tank is returned to the reaction vessel to sustain the biological decomposition reaction. The sludge from the settling tank, containing the smolder coke previously added, is partially dried on a filter press and, without further treatment, is subjected to distillation in a coking oven at a temperature in excess of about 600° C. in the absence of air. The distillation gases resulting from the cokefying process are used to heat the oven with a minimum of addition of other gases. Theoretically, the distillation gases supply sufficient energy for the evaporation of residual water from the sludge in the oven and the distillation process. About 2–3 kg. of the resulting smolder coke are returned to the raw-sewage inlet and the process continued. Excess smolder coke is employed as indicated above.

*Example II*

In a system of the type illustrated in FIG. 2 with two or three reaction or settling tanks, the introduction of the smolder coke takes place with successfully increased amounts per unit volume of the sewage passing through the respective reaction and settling tanks so that the largest proportion of the smolder coke is circulated in a single stage. Since this stage also produces the largest amount of smolder coke a portion thereof can be fed back to an earlier stage to treat, for example, the initial raw sewage. The process otherwise is similar to that of Example I.

*Example III*

An activated sludge treatment of the raw sewage is carried out in a single reaction vessel using so-called sludge mineralization. In this system separate reaction and settling tanks are not employed and the sludges removed from the single vessel are distilled as in Example I and added again to the vessel. The sludge-mineralization-process is otherwise identical to that conventionally employed.

The invention is believed to admit of many modifications and variations within the ability of persons skilled in the art, all such modifications being considered within the scope of the appended claim.

We claim:

A method of treating raw sewage consisting at least in part of decomposable organic household waste, comprising the steps of:
(a) settling a sewage sludge from said raw sewage;
(b) cokefying said sludge by removing water therefrom and heating it in the absence of air at a temperature upwards of about 600° C. to produce an at least partially carbonized sludge smolder coke;
(c) agitating further quantities of said raw sewage prior to the settling of sludge therefrom;
(d) returning only a fraction of the smolder coke produced in step (b) to the raw sewage;
(e) thereafter settling sludge containing said coke from the agitated raw sewage for cokefication thereof;
(f) repeating steps (b) to (e); and
(g) treating another liquid containing cyanide with the remainder of said smolder coke to adsorb contaminants from said other liquid, said remainder of said smolder coke being admixed with a ceramic binder and constituting an adsorbent for said cyanide.

References Cited by the Examiner

UNITED STATES PATENTS

| | | | |
|---|---|---|---|
| 1,617,014 | 2/1927 | Derleth | 210—7 |
| 1,915,240 | 6/1933 | Putman | 210—50 X |
| 2,003,314 | 6/1935 | Russell | 210—36 |
| 2,987,186 | 6/1961 | Burgoon et al. | 210—7 X |

FOREIGN PATENTS 38,413   3/1931   France.

OTHER REFERENCES

Hackh's Chemical Dictionary, third edition, 1944, Blakiston Co., Philadelphia, pp. 169 and 186.

MORRIS O. WOLK, *Primary Examiner.*

MICHAEL E. ROGERS, *Examiner.*